Aug. 2, 1960

G. B. FOX ET AL 2,947,311

DISHWASHER

Filed July 19, 1956

INVENTORS.
GERALD B. FOX &
CHARLES F. STODDARD

BY Marechal, Biebel, French & Bugg

ATTORNEYS

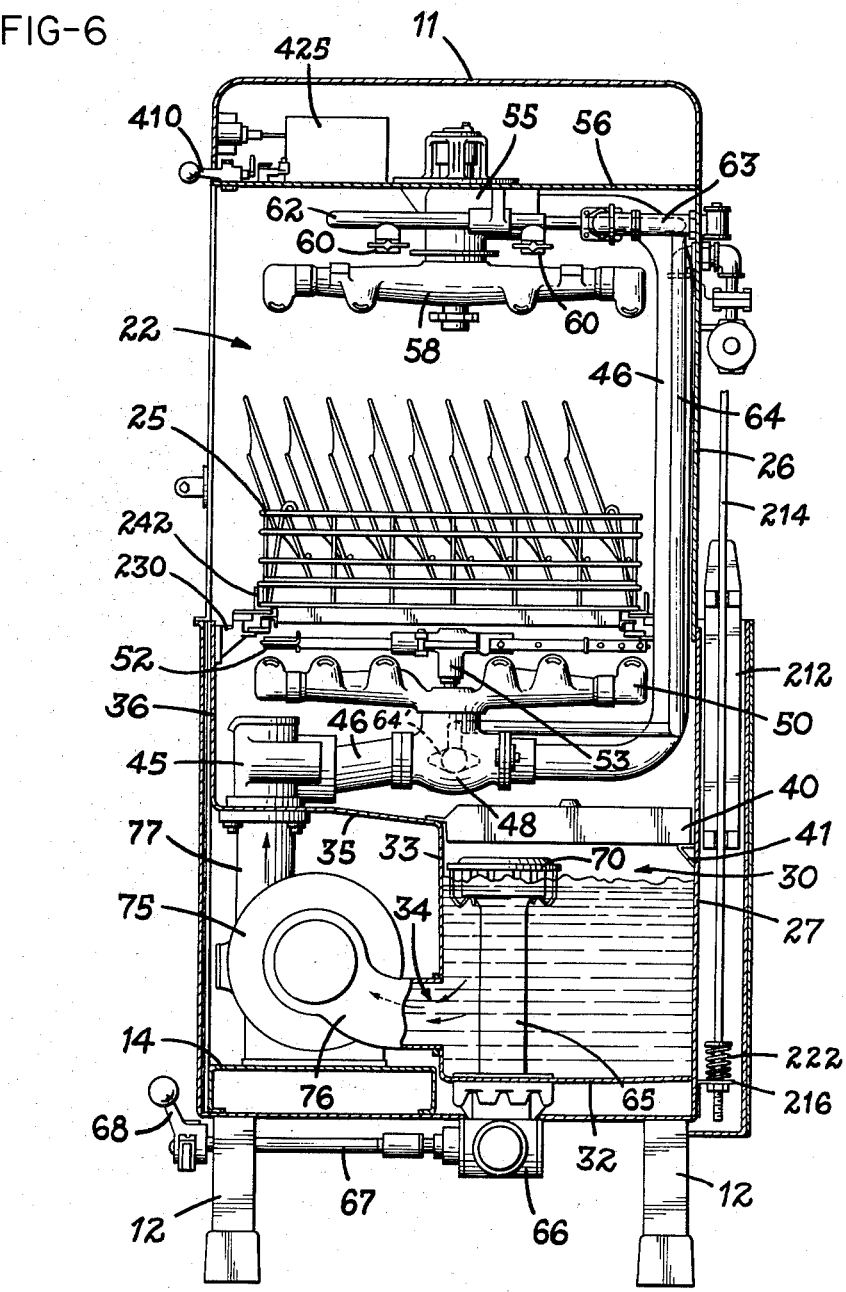

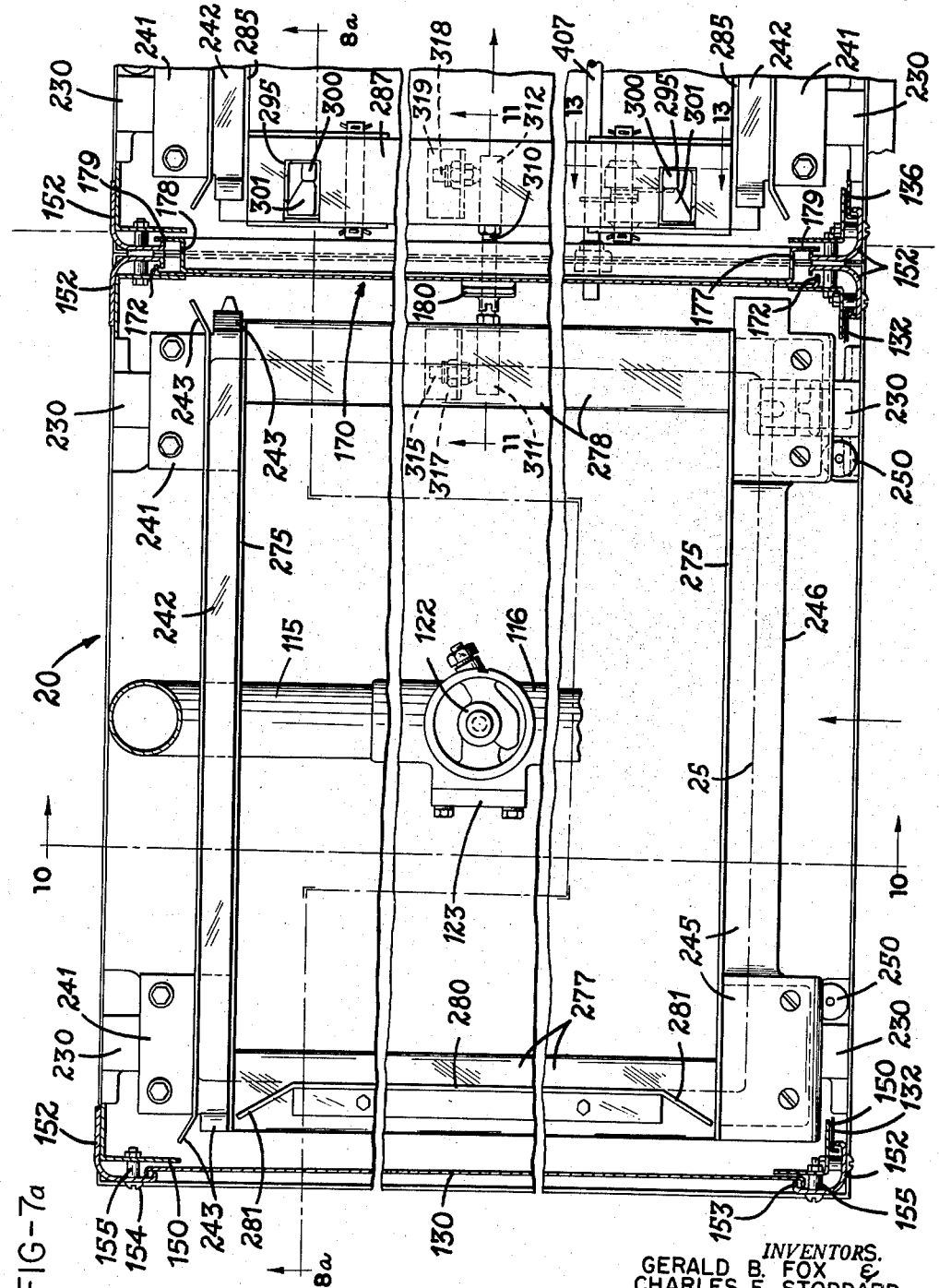

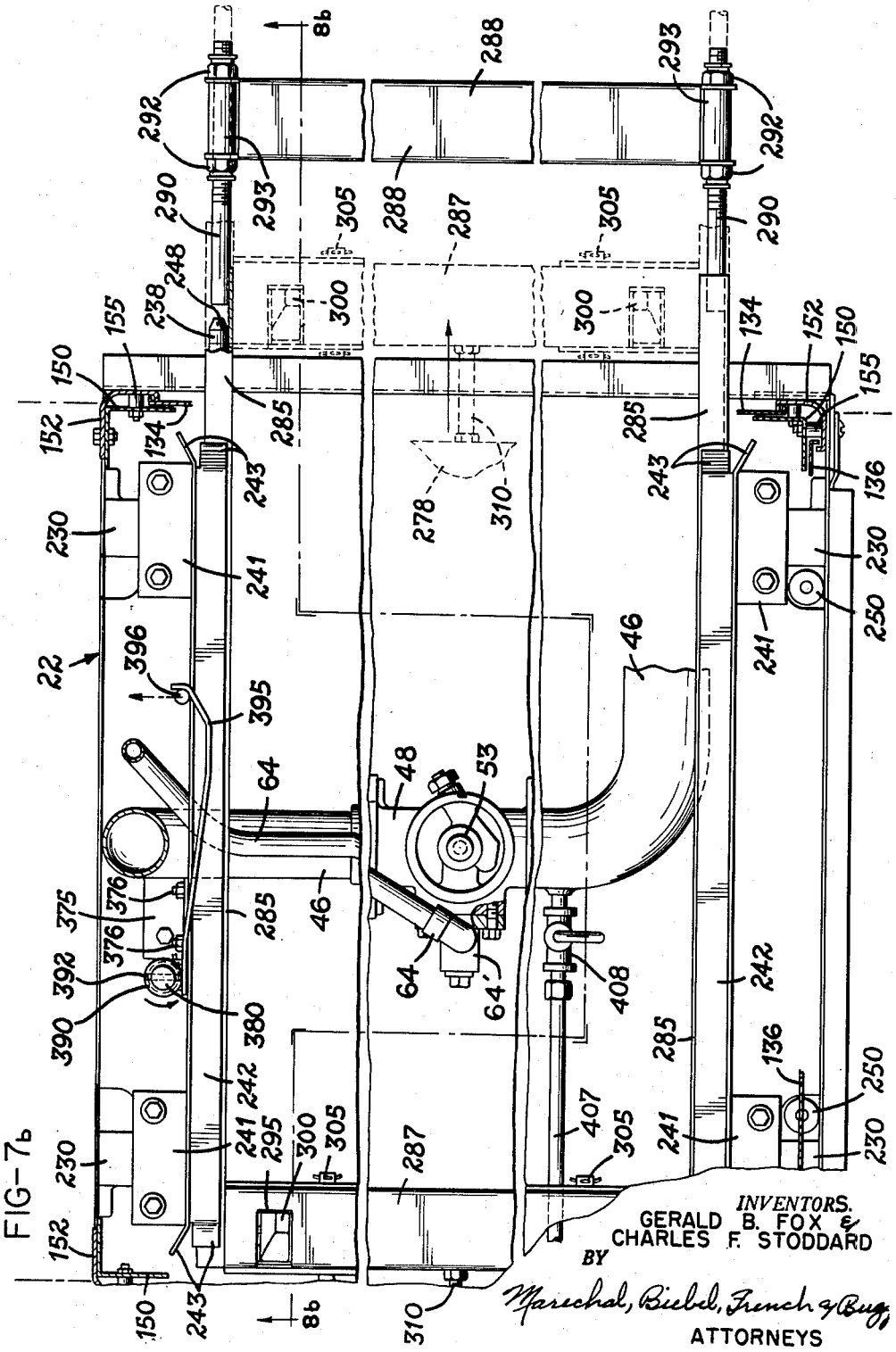

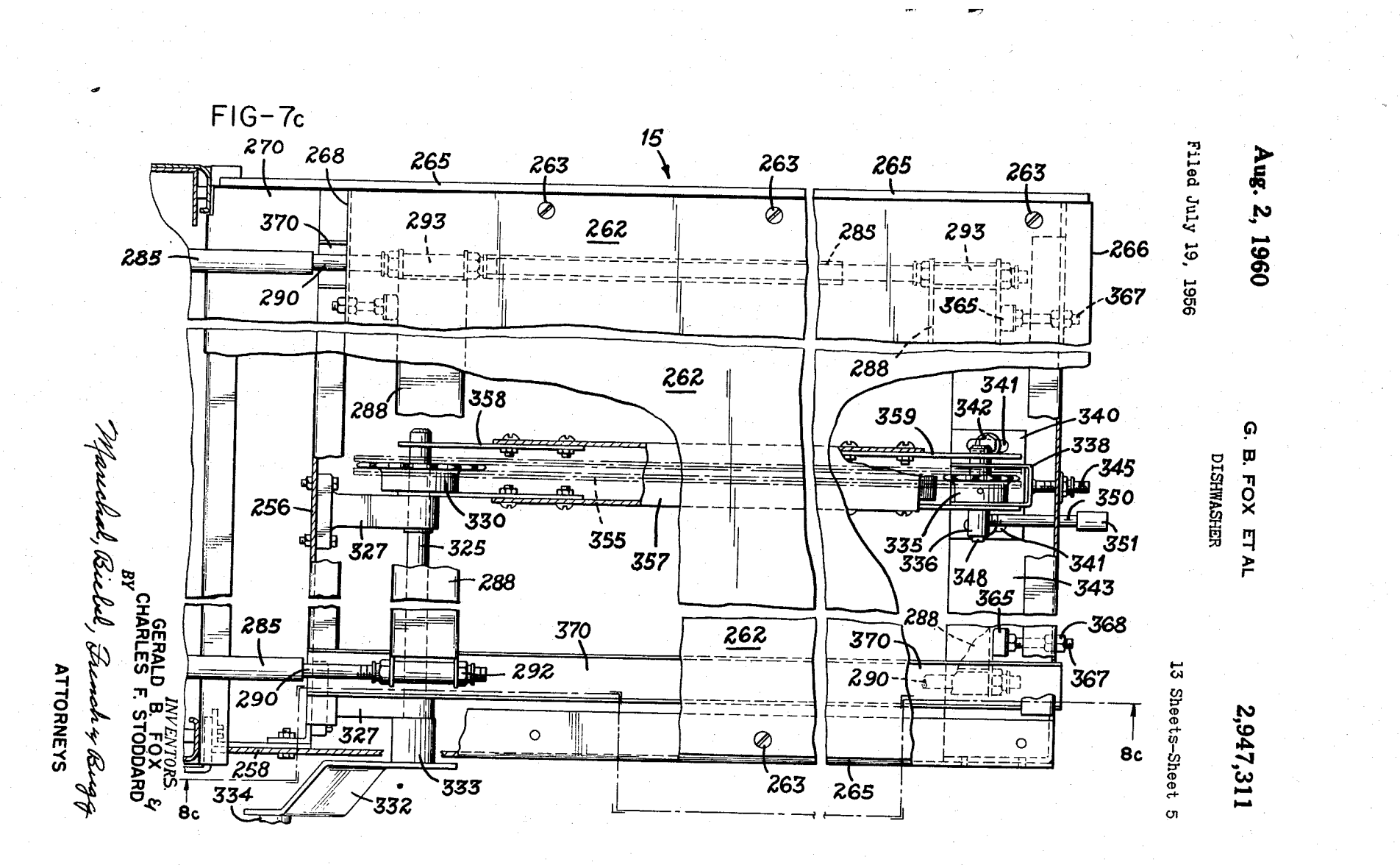

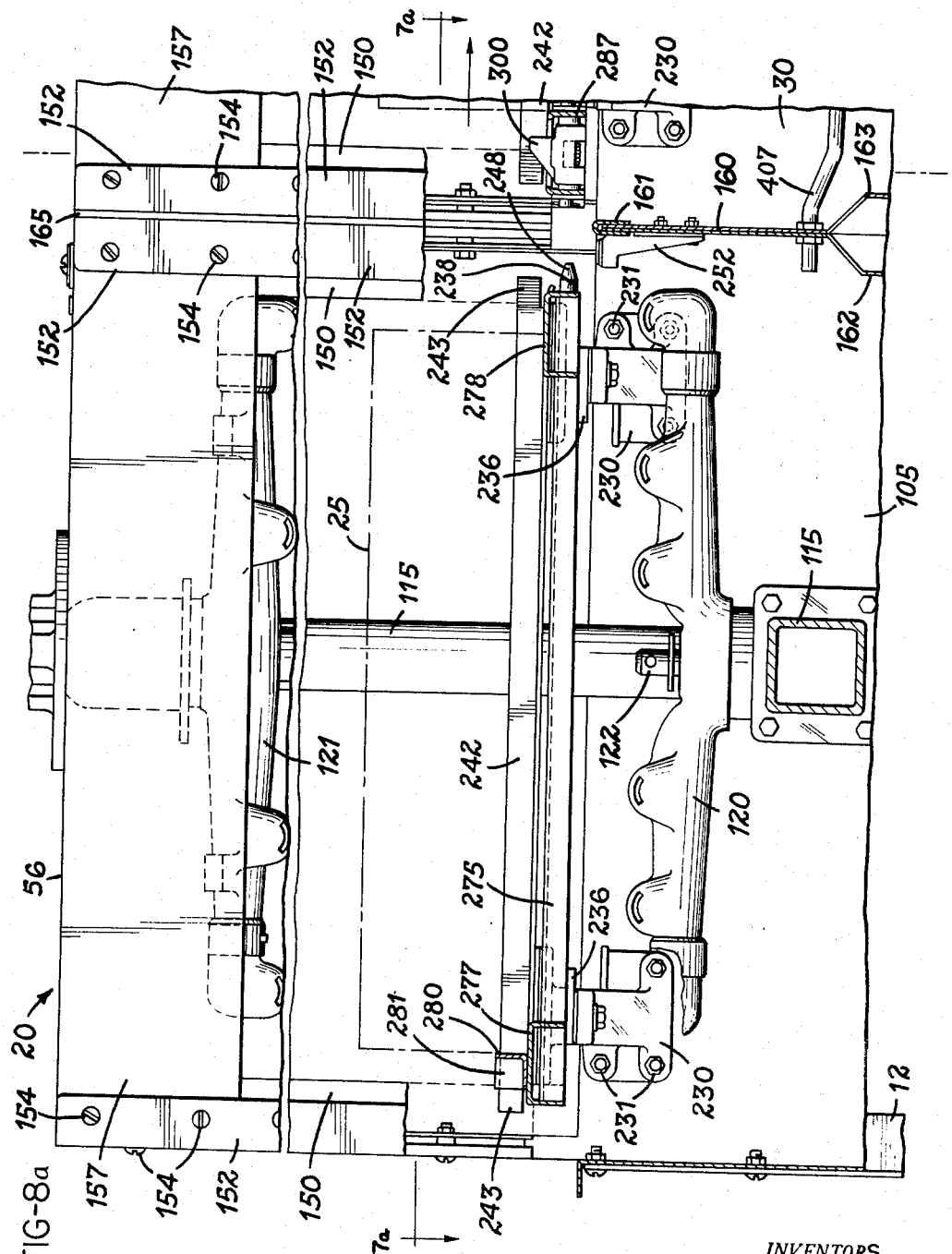

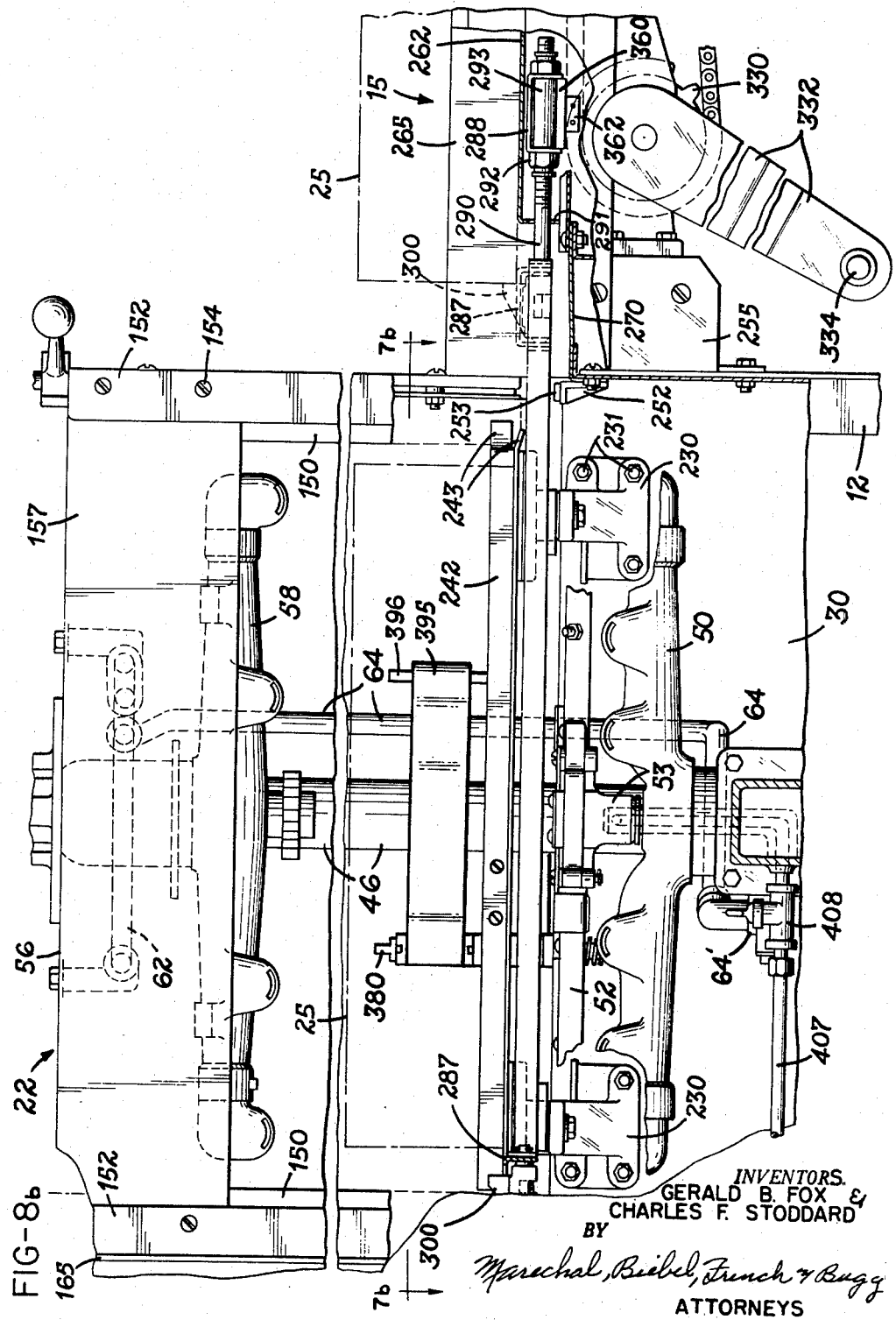

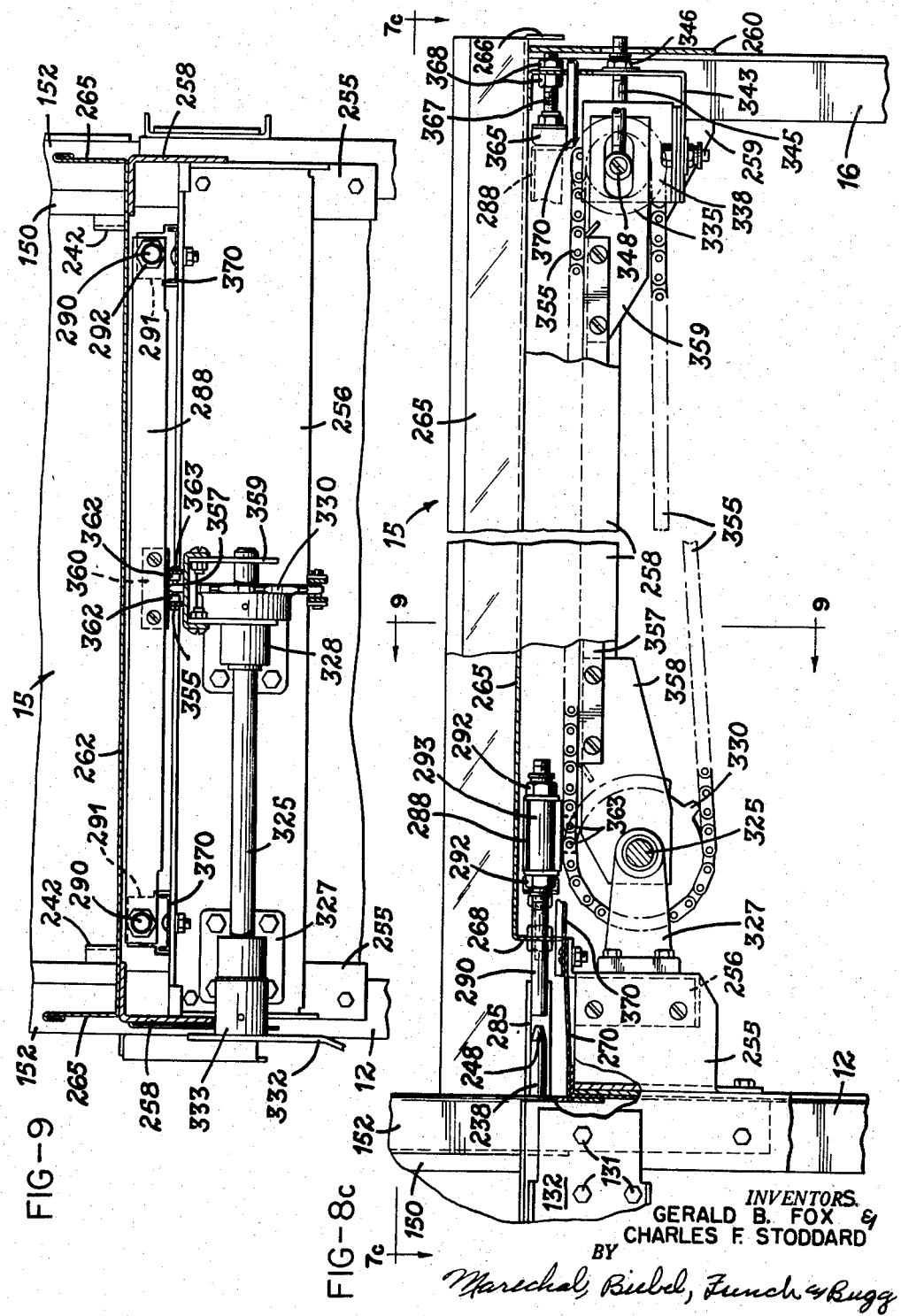

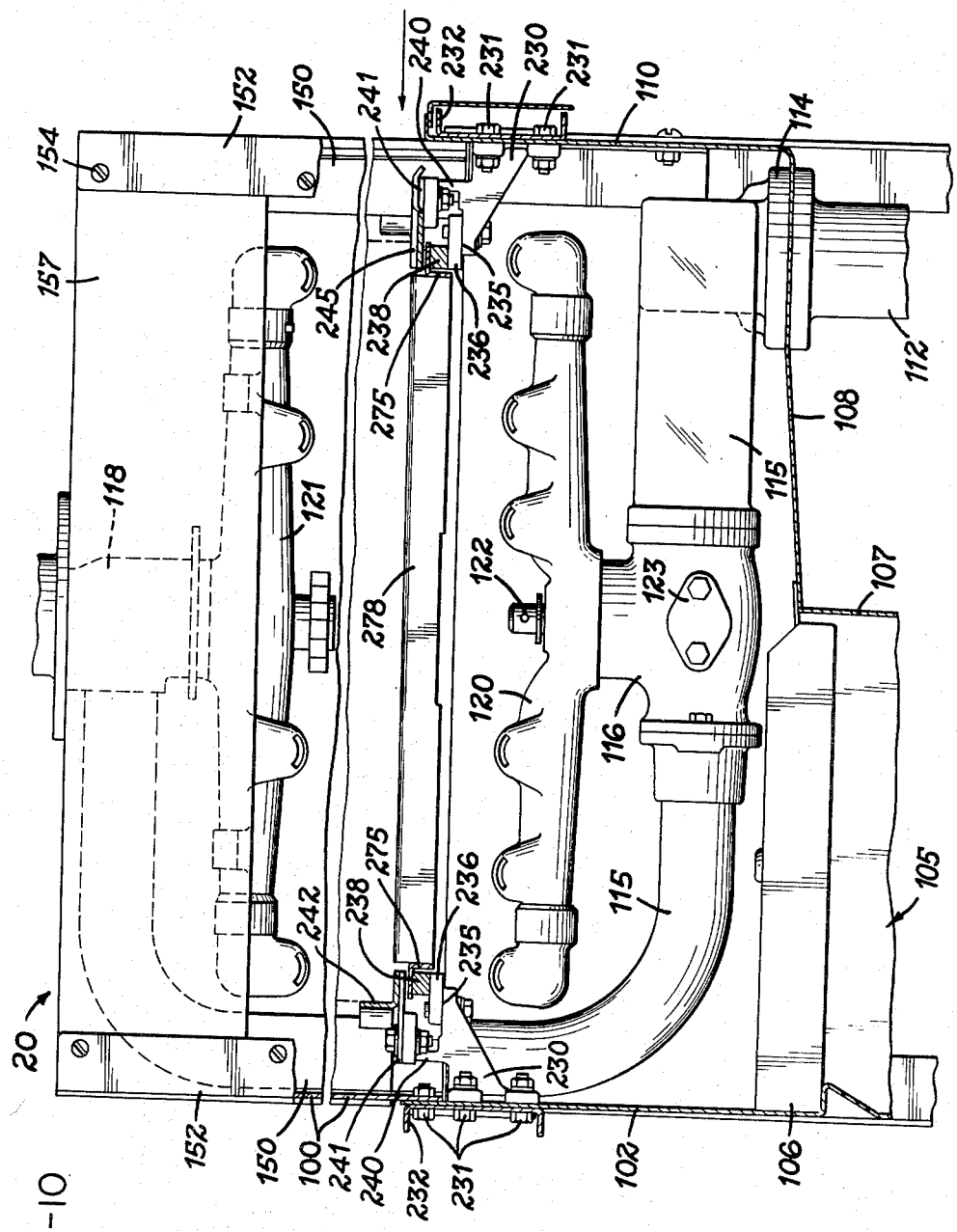

Aug. 2, 1960 G. B. FOX ET AL 2,947,311
DISHWASHER
Filed July 19, 1956 13 Sheets-Sheet 10
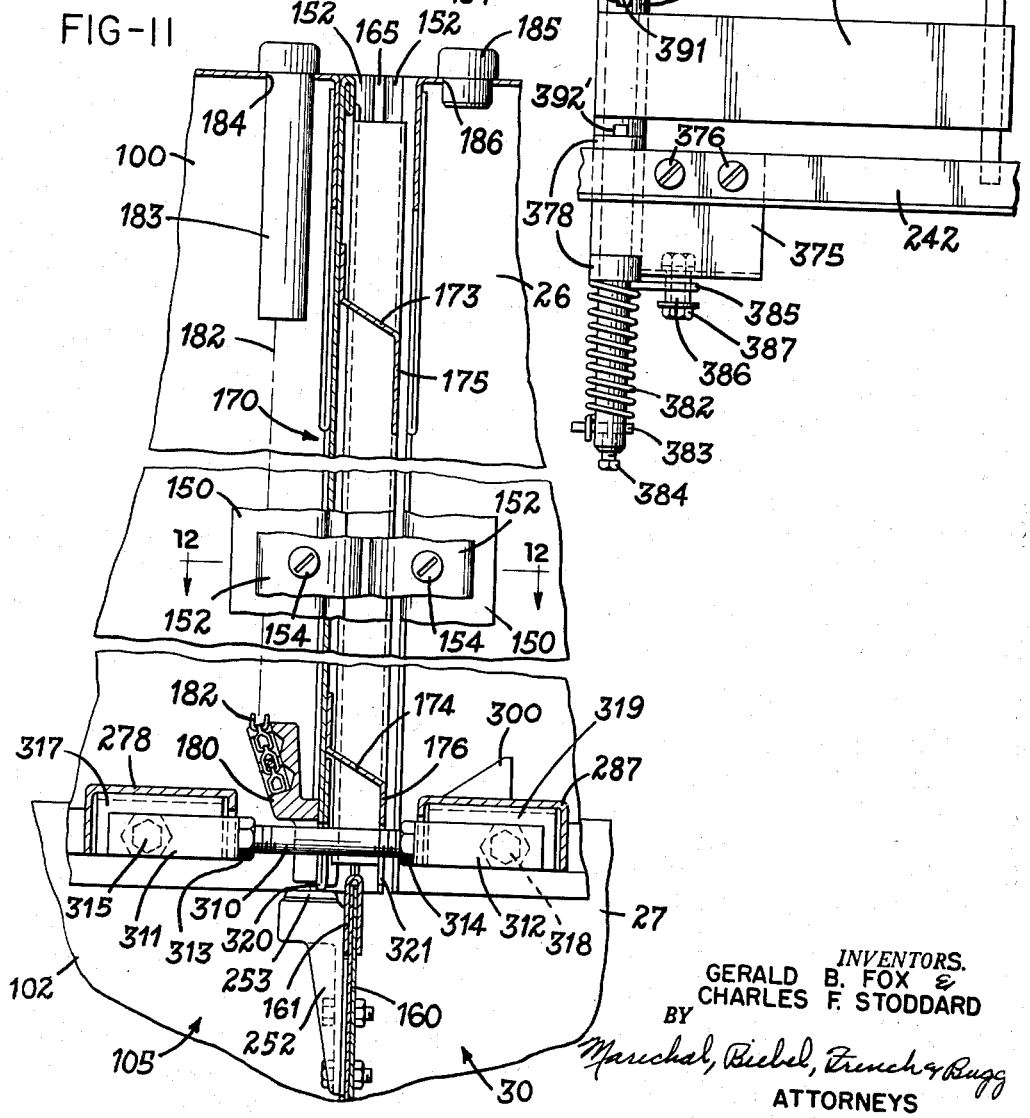
INVENTORS.
GERALD B. FOX &
CHARLES F. STODDARD
BY Marechal, Biebel, French & Bugg
ATTORNEYS

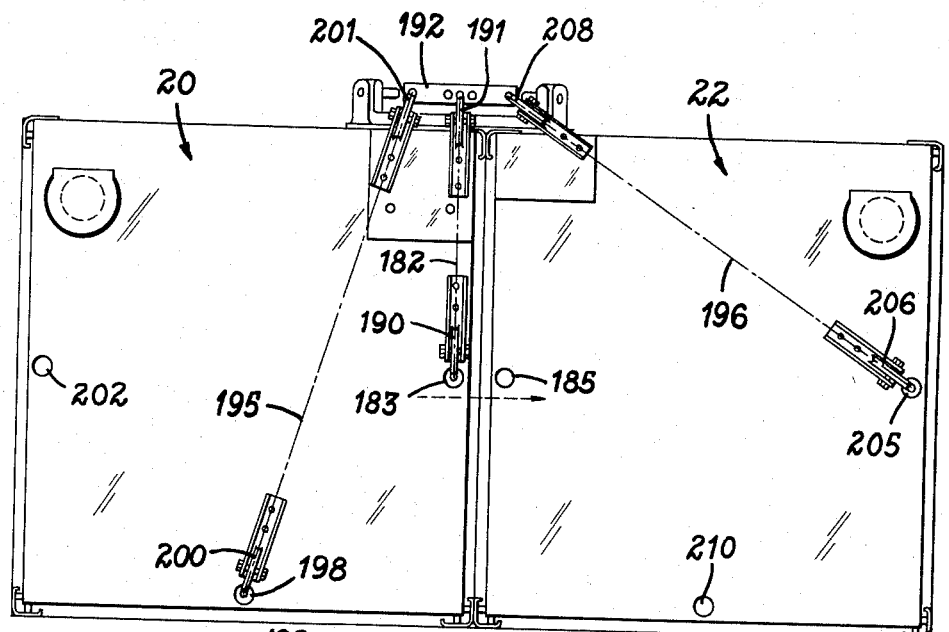
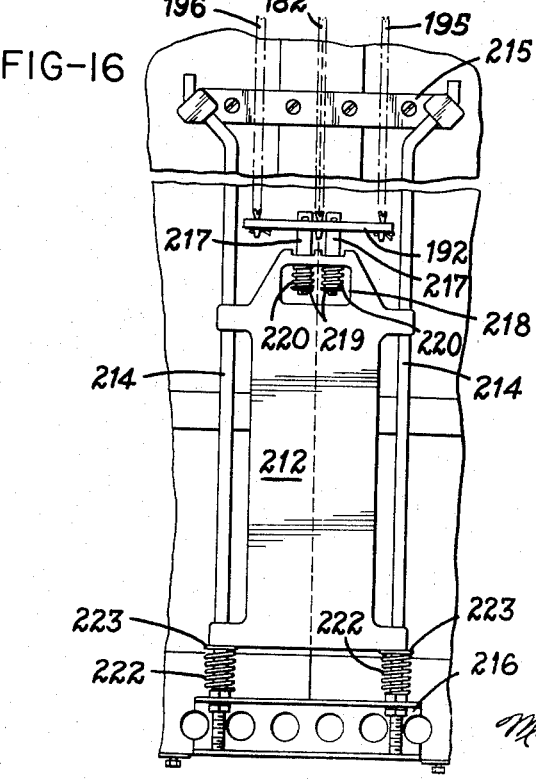
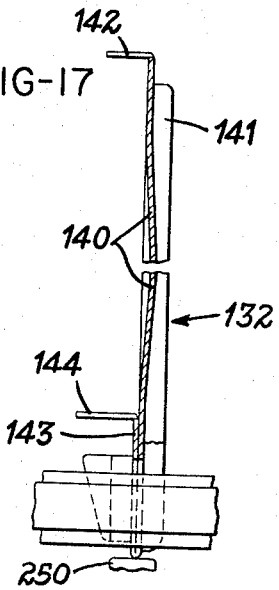

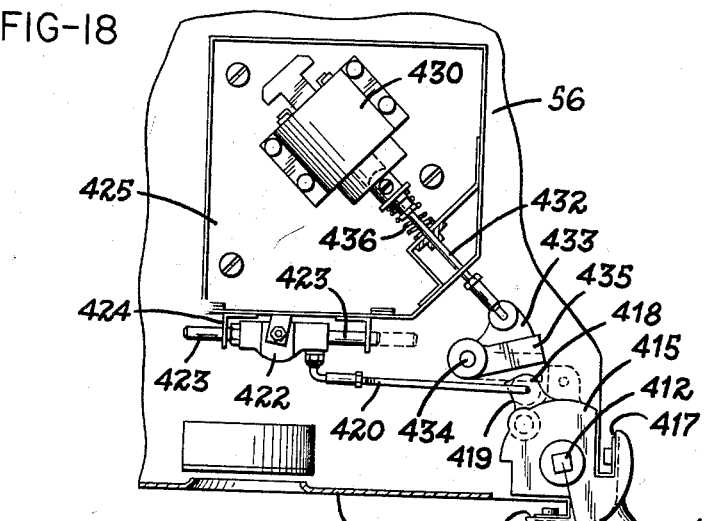
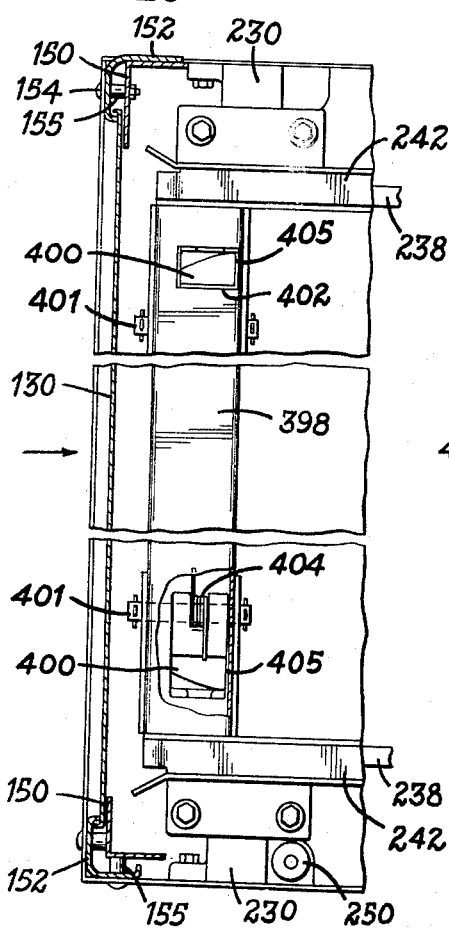
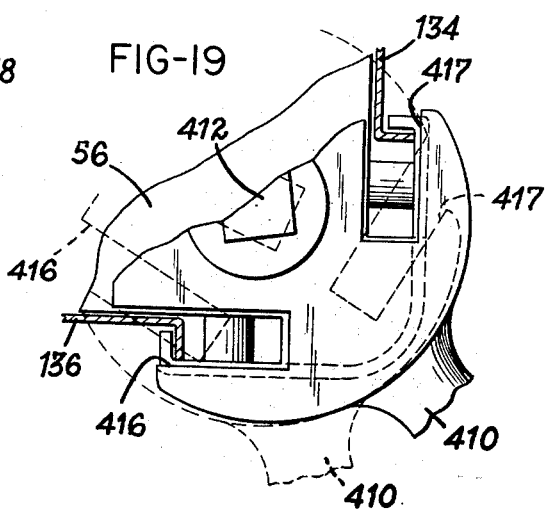

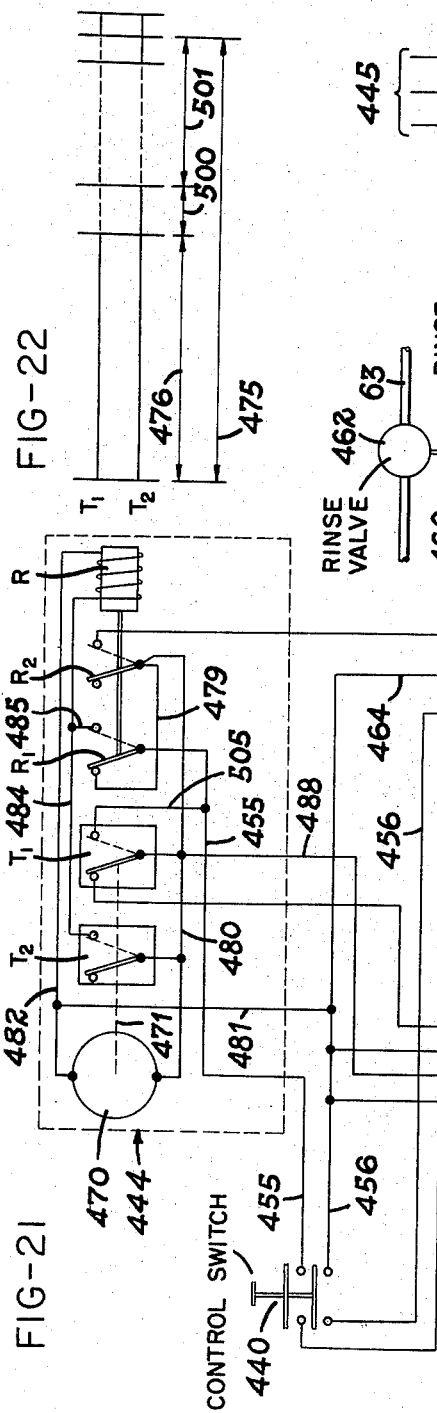

United States Patent Office 2,947,311
Patented Aug. 2, 1960

2,947,311

DISHWASHER

Gerald B. Fox, Troy, Ohio, and Charles F. Stoddard, New York, N.Y., assignors to The Hobart Manufacturing Company, Troy, Ohio, a corporation of Ohio Filed July 19, 1956, Ser. No. 598,773

7 Claims. (Cl. 134—58)

This application relates to a machine for washing dishes and the like.

Many restaurants, hotels and similar institutions find it difficult to provide adequate floor space when it is desired to increase their kitchen facilities, and thus when the need for such increased facilities becomes apparent these institutions must carefully plan the layout of their kitchens to use the available space to the best advantage. Also, many restaurants in crowded cities pay high rentals, and accordingly must make the utmost use of their rented floor space. The tendency in such places, therefore, is toward compact kitchens to provide maximum seating areas within a limited space.

At the same time, the increased seating area and consequent increase in volume of business per unit area creates the need for a dishwashing machine of relatively high capacity, suitable for cleansing the increased number of soiled dishes which follows from such increase in business. The present invention has for its primary object the provision of a high capacity dishwashing machine which occupies a minimum of floor space.

The necessity of careful planning of the kitchen layout, and of using every available square inch of floor space, often makes it desirable to locate the dishwasher along one wall of the kitchen, or perhaps even in a corner of the kitchen. Such installations provide for a flow of racks of dishes along the walls of the kitchen, and thus out of the way of kitchen personnel and other kitchen equipment. Accordingly, a further object of this invention is to provide a high capacity dishwashing machine which is readily adaptable to either straight through or corner type installations, and thus to provide a dishwasher which may be installed against a wall or in a corner of a crowded kitchen, and at the same time provide high capacity service.

A further object of this invention is to provide such a high capacity dishwasher wherein a closed housing is divided into two washing and rinsing compartments of substantially equal dimensions separated from each other during the cleansing operations of the machine, wherein the washing and rinsing mechanisms may be interchanged between the two compartments for use of each compartment as either a washing or a rinsing compartment, and wherein loading of that compartment utilized as the washing compartment may be from either the front of the machine or the side, thus adapting the machine for straight through operation wherein the dishes move laterally through the machine from one side to the other, or for corner type installations wherein the soiled dishes are loaded into the front of the machine and unloaded through the side.

An additional object of the invention is to provide a dishwasher as outlined above which incorporates a transfer carriage for moving the racks of dishes between the two compartments of the machine, and for unloading the racks of cleansed dishes from the machine.

Another object of this invention is to provide such a two-compartment dishwasher which is semi-automatic in operation, to the extent that the washing and rinsing mechanisms of the machine are automatically controlled as to time and sequence of operation when once set into action, and wherein the operation of the transfer carriage is effected manually but only upon completion of the automatic washing and rinsing functions.

A further object of the invention is to provide a two-compartment dishwashing machine wherein each compartment is equipped with a circuit for spraying fluid over dishes supported therein, each circuit including a tank for receiving the fluid, a pump having its inlet connected to the tank, and spray heads in the compartment connected to the outlet of the pump for spraying the fluid over the dishes contained in the associated compartment with the spray fluid returning to the tank, wherein final spray heads are located in one of the compartments, and wherein an automatic control governs the operation of both pumps and of the final spray heads.

An additional object of the invention is to provide a compact two-compartment dishwashing machine having washing and rinsing compartments separated by an openable common door and having an entrance door in one compartment and an exit door in the other compartment, and wherein mechanism interconnects the entrance, exit and common doors to provide for substantially simultaneous opening and closing movement of all three doors.

A further object of the invention is to provide such a compact two-compartment dishwashing machine including washing sprays in the compartment having the entrance door and rinsing sprays in the compartment having the exit door, and to provide interlocking controls for the washing and rinsing sprays which prevent operation of the washing and rinsing sprays when the doors are open and also preventing shutoff of the controls when the doors are closed.

It is another object of this invention to provide a compact two-compartment dishwashing machine wherein the housing is divided into washing and rinsing compartments each including a tank, a pump and spray heads connected in circuit with the tank and the pump for spraying liquid over dishes supported in the compartment, and wherein a metered flow of fluid is conducted from the pump in the rinsing compartment to the tank in the washing compartment during operation of the rinsing pump to maintain the level of liquid in the washing compartment tank.

Other objects and advantages of the invention will be apparent from the following description, the accompanying drawings and the appended claims.

In the drawings—

Fig. 6 is a somewhat schematic vertical section through the rinsing compartment of the dishwashing machine, being the right hand compartment on the arrangement of the machine shown in Fig. 1;

Figure 1:
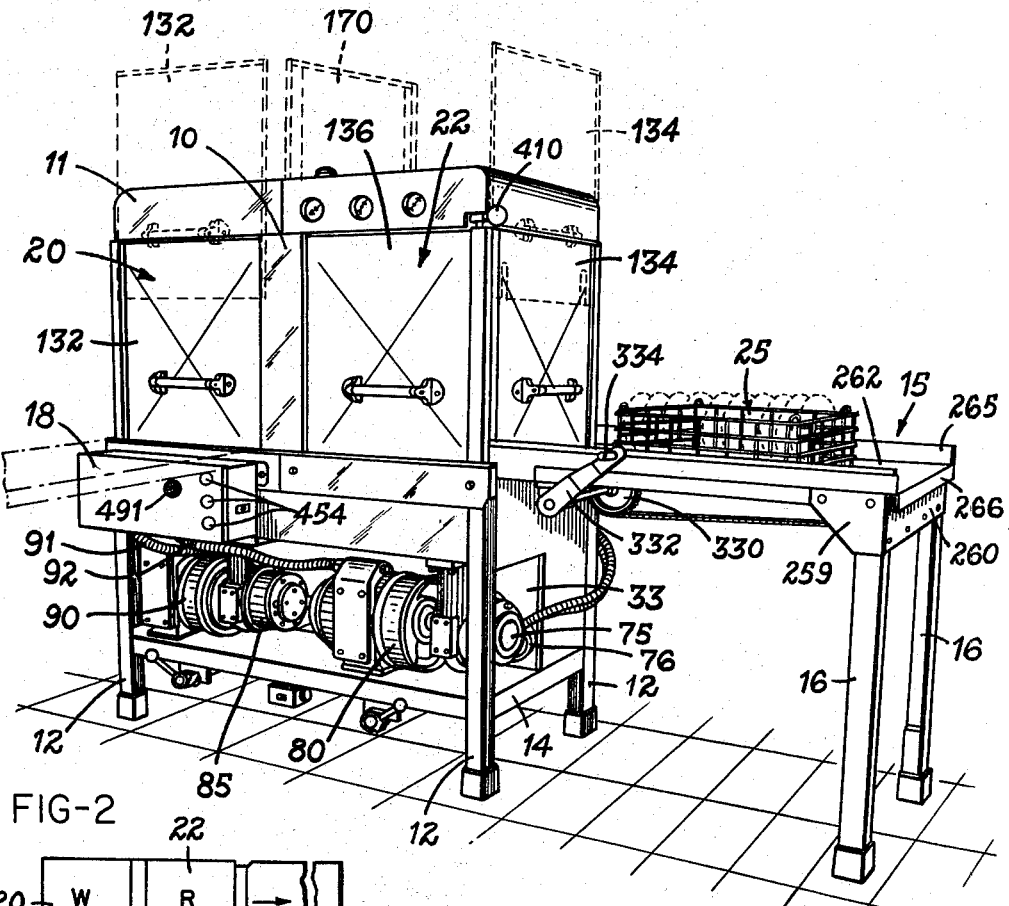
Fig. 1 is an overall perspective view of the dishwashing machine provided by the invention.

Figs. 7a, 7b, and 7c together provide a complete horizontal section through the machine of Fig. 1, taken on lines 7a—7a, 7b—7b, and 7c—7c in Figs. 8a, 8b and 8c, and with the wash and rinse arms omitted for clarity of illustration;

Figs. 8a, 8b and 8c together provide a broken vertical section through the machine taken along lines 8a—8a, 8b—8b and 8c—8c, respectively, in Figs. 7a, 7b and 7c;

Fig. 9 is a section taken along line 9—9 in Fig. 8c;

Fig. 10 is a partial broken vertical section taken on line 10—10 in Fig. 7a;

Fig. 11 is an enlarged partial section taken on line 11—11 of Fig. 7a;

Fig. 12 is a detail section taken on line 12—12 of Fig. 11;

Fig. 13 is a detail section taken on line 13—13 of Fig. 7a;

Fig. 14 is a detail view of the dish rack arresting mechanism shown in top plan in Fig. 7b;

Fig. 15 is a top plan view of the machine in Fig. 1 with the top hood removed to show the arrangement of the door controlling mechanism;

Fig. 16 is an enlarged partial view from the rear of the machine showing further details of the door controlling mechanism;

Fig. 17 is a broken detail view, partly in section and partly in elevation, showing the construction of one of the outer doors of the machine;

Fig. 18 is a detail view of the control lever and interlocking mechanism seen at the front upper right corner of the machine in Fig. 1;

Fig. 19 is an enlarged detail view of the control lever in Fig. 18, illustrating the interlocking action between the lever and the doors;

Fig. 20 is a partial horizontal section similar to the left hand portion of Fig. 7a, and showing a modified construction used with a side entrance;

Fig. 21 is a schematic wiring diagram of the control for the dishwashing machine; and Fig. 22 is a diagram illustrating the cam timing of the timer illustrated in Fig. 21.

Referring to the drawings, which illustrate preferred embodiments of the present invention, Fig. 1 illustrates the dishwashing machine provided by the present invention in a typical corner type or right angle type of operation. The machine includes a housing 10 covered by a hood 11 and supported upon legs 12 which also support a lower platform 14. A table indicated generally at 15 extends from the discharge side of the machine and is supported at its outer end by legs 16. A control box 18 is secured to the front of the machine for housing the automatic control mechanism which will be described below.

The housing 10 is divided to provide two separate chambers or compartments indicated generally at 20 and 22, and preferably of substantially identical dimensions for the purpose of reversing the functions of these compartments and utilizing either of them as a washing compartment or a rinsing compartment in accordance with the desired type of installation. The versatility of the type of two-compartment construction provided by the present invention will be apparent from consideration of Figs. 2–5 which illustrate, in block diagram form, plan views of the various types of installations to which this dishwashing machine is readily adapted.

In each of the diagrams in Figs. 2–5, the function of each compartment 20 and 22 is indicated by the letter W or R to designate the use of the compartment as a washing compartment W or a rinsing compartment R. Thus in Fig. 2 a corner installation is shown with the path of the dishes through the machine being from left to right, as indicated by the arrows. The racks of dishes enter the machine from the front on an entrance ramp 23, which may or may not be used as desired, and pass through compartment 20 as the washing compartment and the compartment 22 as the rinsing compartment, and the clean dishes are discharged to the right onto the table 15.

Figure 3:
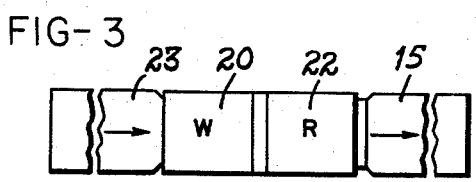
Figure 4:
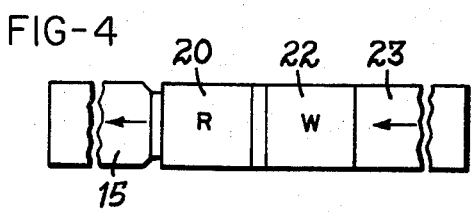

The example of Fig. 3 illustrates a straight through left-to-right installation with the soiled dishes entering the side of compartment 20, which is the washing compartment, passing through compartment 22 as the rinsing compartment and discharging onto table 15. Fig. 4 shows the reverse of the installation shown in Fig. 3, with the soiled dishes entering compartment 22 which is arranged for use as the washing compartment and passing through compartment 20, which is now used as the rinsing compartment, and exiting onto the table 15, which is always attached to the discharge side of the machine, and hence in this installation is attached to the side of compartment 20.

Figure 2:
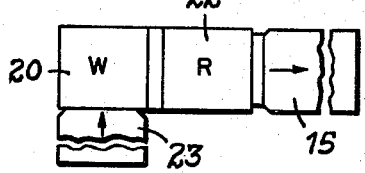
Figs. 2, 3, 4 and 5 are schematic block-type diagrams illustrating the various ways in which the machine of Fig. 1 may be arranged for straight through or corner installations.
Figure 5:
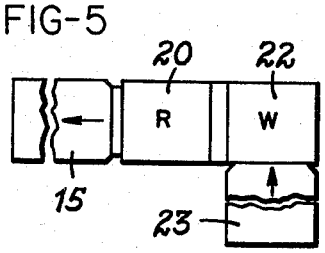

A fourth type of installation is shown in Fig. 5 as a corner or right angle type of arrangement reversed from the installation shown in Fig. 2. Here the soiled dishes enter the front of compartment 22 which is now the washing compartment, pass through compartment 20 where they are rinsed, and exit onto table 15. It is therefore apparent that the dish-washing machine provided by this invention is highly versatile in its adaptation to different types of installations.

The following description of the machine assumes that it is to be utilized in a left-to-right corner installation of the type shown in Fig. 1 and Fig. 2. Therefore, the compartment 20 is described as a washing compartment, and compartment 22 as a rinsing compartment. The modifications necessary to reverse the functions of these two compartments will be pointed out in the course of the description. Each compartment includes what may be broadly described as a circuit for spraying liquid over dishes supported in the compartment, and each such circuit comprises spraying heads for spraying the liquid over the dishes, a tank for receiving the liquid as it drains from the dishes, and a pump having its inlet connected to the tank and its outlet connected to the spray heads for recirculating the liquid through the spray heads, over the dishes to be cleansed, and back to the tank.

Thus, referring to Fig. 6, a conventional dishrack 25 is supported within compartment 22, and this compartment includes an upper rear wall 26, which forms the back of the upper part of the compartment for receiving the dishes to be cleansed, and a lower rear wall 27 which overlaps and is attached to the lower edge of wall 26. The lowermost portion of wall 27 provides the rear wall for a tank indicated generally at 30 and including a bottom 32 and a front 33 provided with an outlet opening 34. The tank front 33 is recessed from the front of the machine, so that the cross section of the tank occupies only about one-half of the cross section of the lower portion of the machine. The upper portion of the tank 30 includes a forwardly extending wall 35 and an upper front wall 36 which is secured at the corner of the machine to the leg 12. A suitable strainer tray 40 rests across the portion of the tank between the connection of walls 33 and 35 and a supporting bracket 41 on rear wall 27.

Within the wider portion of the tank there is supported an inlet fitting 45 which is in turn connected to a manifold 46 having a T-connection therein at 48 for supporting a revolving spray head of the type disclosed in the patent to Gerald B. Fox et al., No. 2,714,038. This spray head includes a larger revolving power spray arm 50 and a smaller pressure spray arm 52 supported on the larger arm and having a stem 53 extending coaxially therethrough. Manifold 46 extends rearwardly and upwardly along the upper rear wall 26, and at the top of the tank extends toward the center thereof to an upper fitting 55 which is carried by the top wall 56 of the tank and in turn supports a revolving power spray head 58 for spraying liquid downwardly over the dishes supported in compartment. Also supported at the top of the compartment are a plurality of pressure rinse nozzles 60 carried by an upper pressure rinse header 62 which is connected to a supply pipe 63 for delivery of heated water under pressure to the nozzles 60 for use as a final rinse fluid. An extension pipe 64 connects the supply pipe 63 to a fitting 64' in T-fitting 48 for supply of hot water to the revolving pressure rinse arm 52.

Tank 30 is provided with a level maintaining overflow type of drain 65 supported to extend through the tank bottom 32 and connect to the main drain of the machine through a valve 66 which may be controlled from the front of the machine through a cross shaft 67 adapted to be turned by a lever 68 at the front of the machine. A guard cap 70 is preferably fitted to the top of the overflow drain 65 to keep pieces of refuse which may have passed through the screen 40 from flowing to the drain.

Referring to Fig. 1, a pump 75 is supported on platform 14 and has its inlet 76 connected to the tank outlet 34, and the outlet 77 of pump 75 is connected to the inlet fitting 45 for pumping the liquid from tank 30 to manifold 46 and thence to the lower and upper revolving spray arms 50 and 58. These revolving arms are therefore referred to as power spray arms since they receive liquid under pressure from pump 75. The pump 75 is shown as driven by an electric motor 80, and an identical pump 85 is provided for the tank of compartment 20, driven by another motor 90. Power supply lines 91 and 92 for motors 80 and 90 extend to the control box 18, for the purpose of controlling operation of the pumps as will presently be described.

The washing compartment 20 is substantially identical to compartment 22 in its construction, and as shown in Fig. 10, compartment 20 includes an upper back wall 100 and a lower back wall 102 providing the rear of a tank 105 covered by a strainer 106, and having a lower front wall 107. The wall 107 is joined to a horizontally extending wall 108 which projects forwardly over the motor 90 and is integrally connected to a front wall 110. The outlet 112 from pump 85 connects to one end of a fitting 114 supported on wall 108 and attached at its other end to a manifold 115 which passes through a T-connection 116 and extends upwardly along the rear walls 100 and 102 and forwardly beneath the top of compartment 22 to a connection with an upper fitting 118. A lower power spray head 120 is rotatably supported upon the T-connection 116, and an upper spray head 121 is supported from the upper fitting 118. Liquid from tank 107 is thus circulated by pump 85 through manifold 115 to the upper and lower spray heads 120 and 121 and sprayed therefrom over dishes supported in the compartment 20. Tank 105 is also provided with an overflow type of drain (not shown) identical to drain 65 in tank 30.

Since provision is to be made for the accommodation of pressure rinsing equipment in compartment 20 for installations such as shown in Figs. 4 and 5, the T-fittings 116 and 48 are identical, but in the case of the fitting to be used in the washing compartment, as illustrated in Fig. 10, a blind plug 122 is threaded into the passage in the T-connection 116 which ordinarily accommodates a pressure spray arm such as shown at 52 in Fig. 6. Likewise, the connection for pressure liquid to be supplied to such a spray head is blocked by a plate 123 which is secured over the passage in the T-connection 116 adapted to receive heated water under pressure for use as a final rinsing liquid. Furthermore, an upper pressure rinse header and nozzles may be provided in compartment 20 in the same manner as shown in compartment 22 when it is desired to use compartment 20 as the rinsing compartment of the machine.

Each of the compartments 20 and 22 is provided with outer front and side doors, the washing compartment 20 having a side door 130 and a front door 132, and the rinsing compartment having a side door 134 and a front door 136. A detail of one such door, preferably formed from a single sheet of material, is shown in Fig. 17. It includes a central portion 140 having forwardly extending flanges 141 at its opposite sides and a rearwardly extending flange 142 at its top. At the bottom of the door the material is doubled back and extends upwardly as at 143, terminating in an inwardly extending flange 144.

The corners of each compartment are formed by angle members 150, and cap members 152 having inwardly bent longitudinal flanges 153 are mounted on each angle member by bolts 154 having spacers 155 which separate each angle member from its associated cap and provide vertical channels at the corners of the compartments for receiving the forwardly extending side flanges 141 of the doors. Thus the doors are supported in vertically sliding relation at the front and side of compartments 20 and 22, as shown in Figs. 7a and 7b, and in addition effectively baffle the corners to prevent splashing of liquid out of the machine through the door joints. At the top of each door opening a cross plate 157 extends between the cap members 152 and rests upon the upper ends of angle members 150 which terminate short of the top walls of the compartments, as shown in Figs. 8a, 8b, and 10.

Compartments 20 and 22 have a common central wall formed by a lower double section 160 (Figs. 8a and 11) covered by a horizontally extending generally U-shaped cap 161. The lower portions of the double section 160 diverge from each other as lower walls 162 and 163, forming sides of the tanks 105 and 30, respectively. In the upper portions of the compartments the adjacent sides of cap members 152 at the center of the machine are assembled back to back with a vertical spacer bar 165 between them. Thus in the center of the machine there are two vertical door receiving channels at the front and back of the machine.

A common central door 170 extends between the compartments 20 and 22, and includes vertically extending flanges 172 (Figs. 7a and 12) received within the above mentioned door channels. Door 170 includes upper and lower horizontal baffle members 173 and 174 having downwardly extending lips 175 and 176, respectively, for directing liquid splashed against the central door back into the tank 30. In addition, vertical baffle members 177 and 178 are carried by door 170 along its front and rear edges, and these vertical baffle members include flanges 179 which project into the vertical door receiving channel opposite from the flanges 172. At the lower end of door 170, preferably on the side facing tank 105, there is carried a chain anchor bracket 180 to which is pinned one end of a central door operating chain 182. This chain extends upwardly, as shown schematically in Fig. 11, through a guide tube 183 which projects through an opening 184 in the top wall of chamber 20. A plug 185 of substantially the same diameter as tube 183 is received within an opening 186 in the top wall of compartment 22, and the position of tube 183 and plug 185 may be reversed if it is desired to reverse the central door 170 in its channels.

Referring to Fig. 15, chain 182 passes over idler pulley 190 as it emerges from the guide tube 183, and the chain then extends rearwardly over the top of the machine to another idler pulley 191, and passes downwardly along the back of the machine to a connection with a cross bar 192. In a similar manner, door control chains 195 and 196 are provided for one of the doors in each of compartments 20 and 22, respectively. Referring first to compartment 20, chain 195 is shown in its position for operating the front door 132, and extends through a guide tube 198 in the top wall of compartment 20 and is fastened to a suitable anchor bracket (not shown) at the lower edge of door 132. Chain 195 extends from guide tube 198 over a pulley 200, rearwardly over the top of the machine over another pulley 201 and downwardly to a connection with cross bar 192. If, in installations such as described in Figs. 3, 4 and 5, it is desired to control the end door 130, then guide tube 198 can be placed in an aperture over the top of that door which is normally closed by a plug or removable cover 202. Of course, in such a modified installation the pulley 200 will also be moved to a location above door 130, and pulley 201 will be realigned.

In like manner, chain 196 passes through a guide tube 205 supported in the top of compartment 22 above door 134, and the end of the chain is secured to an anchor bracket (not shown) at the bottom of door 134. Chain 196 passes over pulley 206 and rearwardly toward the center of the machine over a pulley 208 and downwardly to a connection with cross bar 192. Also, a suitable plug or cover 210 normally fills an aperture above front door 136, and in installations such as in Fig. 5, wherein it is desired to control door 136, the pulley 206 may be moved to a location adjacent the front door and guide tube 205 substituted for the plug 210. The rear pulley 208 will, of course, have to be suitably rearranged.

Referring to Fig. 16, a counterweight 212 is slidably supported within vertically extending guide rods 214 mounted on the rear of the machine by an upper bracket 215 and a lower bracket 216 symmetrically arranged with respect to the center of the machine. A pair of connecting rods 217 extend through suitable openings in cross bar 192, and also through the upper end of weight 212 into a recess 218 at the upper end of the weight. The lower ends of connecting rods 217 carry suitable washers 219, and springs 220 rest between these washers and the upper edge of recess 218 to provide a shock absorbing connection between the counterweight and cross bar 192. Also, suitable springs 222 are supported about the lower ends of guide rods 214, and washers 223 rest on the upper ends of springs 222 for engaging the lower edge of weight 212 as it descends along the guide rods, thus providing a shock absorbing arrangement for the descending weight.

The central door 170 and one of the doors in each of compartments 20 and 22 can therefore be operated in unison under control of the counterweight 212 and the connecting chains 182, 195 and 196. Thus when the operator wishes to open the doors of the machine to place a rack of dishes in the washing compartment, and at the same time to transfer the dishes in the washing compartment to the rinsing compartment and to eject the rinsed dishes from the machine, manual opening of one of the interconnected doors, preferably the door being used as an entrance, will result in substantially simultaneous opening of the central door 170 and the door in the rinsing compartment being used as an exit.

Each of the compartments 20 and 22 is provided with structure for supporting a rack of dishes to be cleansed, and a carriage operates within the supporting structure and cooperates therewith to transfer the racks of dishes from one compartment to another and to eject the rack containing clean rinsed dishes from the rinsing compartment, through the exit door onto table 15.

Referring to Figs. 7a, 8a, and 10, the rack supporting structure in the compartment 20 comprises four brackets 230, two of which are fixed by suitable bolts 231 and a reinforcing piece 232 to the front compartment wall, and the other two of which are similarly supported on the rear wall of the compartment, at opposite sides thereof. Each of these brackets has a lower supporting face 235 located at a level somewhat above the lower power spray arm 120, and supporting arms 236 are bolted or otherwise secured to these faces and carry stationary rails 238 which extend transversely of the compartment, that is, from side to side as viewed from the front of the machine.

Each bracket 230 also has an upper part 240 carrying a supporting plate 241. The plates 241 at the rear of compartment 20 extend above the adjacent rail 238 and in turn carry angle member 242 having wing portions 243 (Fig. 7a) at its ends bent downwardly and outwardly, respectively, from the remainder of this angle member. At the front of the compartment 20 the plates 241 support an apron member 245 having a contoured center section 246 adapted to guide the racks of dishes as the racks are slid into position in the washing compartment.

The rack supporting structure in compartment 22, shown in Figs. 6, 7b and 8b, is substantially the same as the structure just described in connection with compartment 20, and like reference numerals have been applied to the brackets, rails, plates and supporting angles to avoid duplication of description. The rails 238 in compartment 22, however, extend outwardly of door 134 and terminate in tapered ends 248 (Fig. 7b). Also, there are angle members 242 at both the front and back of this compartment, since the entrance apron 245 is not needed in compartment 22 when this compartment is used as the rinsing compartment, but in an installation such as shown in Fig. 5, the apron member 245 would replace the front angle member 242 in compartment 22, and the front angle member 242 would similarly be used in compartment 20.

Each of the front brackets 230 carries a circular stop 250 (Figs. 7a and 10) for engagement by the lower edge of the front doors 132 and 136 to support these doors in their closed position. Similar stops or bumpers are provided on separate brackets for end doors 130 and 134, such as bracket 252 and 253 in Fig. 8b.

The table 15 for attachment to the exit or unloading side of the machine includes brackets 255 (Fig. 8c) which are bolted to the side of the machine below door 134 and carry between them a transverse plate 256. The frame of the table is provided by outwardly extending side angle members 258 suitably fastened to the brackets 255 and secured at their outer ends to the inwardly turned corners 259 of an end plate 260 carrying the legs 16 which support the outer end of the table. The top of table 15 is provided by a sheet metal plate 262, which is secured by a plurality of screws 263 to the side members 258 and includes upwardly extending side flanges 265 and a depending lip 266 at its outer end. At the inner end of top 262 is a depending flange 268 (Fig. 8c), and a drain plate 270 extends from the lower edge of flange 268 through the side wall of compartment 22 for carrying rinse water drained from the racks of clean dishes on the table back into tank 30 of compartment 22.

The present machine incorporates a carriage, preferably manually actuated, which is adapted to receive the racks of soiled dishes in the washing compartment, to transfer the washed racks into the rinsing compartment when the central door 170 is opened, and to discharge the rinsed and cleansed dishes onto table 15. Referring to Figs. 7a, 8a and 10, the portion of the carriage normally contained within compartment 20 includes a pair of inverted angle members 275 connected by inverted U-shaped cross members 277 and 278. The upper or horizontal legs of angle members 275 are slidably supported on the top surface of rails 238 for movement between a normal or retracted position within the compartment 20, substantially aligned between the rack supporting structure as shown in Fig. 7a, and an advanced position within compartment 22.

An indexing angle 280, having laterally bent end portions 281, is fixed to the top surface of cross member 277 for engaging the sides of the dish racks as the racks are pushed into compartment 20, thus centering them between the power spray heads upon the rack supporting structure. It will be noted from Fig. 10 that the upper surfaces of the carriage cross members are in substantially the same horizontal plane as the surfaces of the horizontal leg of the rack supporting angle 242 and the upper surface of apron 245, for ease of sliding movement of the racks across the carriage onto angle member 242.

The carriage also includes a second section normally positioned within compartment 22 and adapted to move through door 134 to an advanced position outwardly of that compartment and substantially enclosed beneath the top of table 15. This advanced position of the carriage is shown in dotted lines in Figs. 7b, 7c, 8b and 8c. This second section of the carriage includes inverted angle members 285 connected by a transversely extending inverted U-shaped cross member 287, and by a similar cross member 288 supported between thrust rods 290 which are welded or similarly secured to the ends of the angle members 285, as shown in Fig. 7b and Fig. 8c.

The thrust rods 290 and the cross member 288 are positioned outside of compartment 22, with the rods extending through suitable openings 291 (Fig. 9) in the depending lip 268 of the table top. The cross member 288 is thus positioned beneath the table top 262. The ends of rods 290 are threaded, as shown in Fig. 7b, and carry lock nuts 292 which are threaded into locked engagement with opposite sides of cross member 288, and a spacer sleeve 293 supports the cross member against the pressure of these nuts. This arrangement provides for an adjustment of the position of the cross member 288 with respect to the remainder of the carriage, in order to establish the advanced position of the carriage.

The cross member 287 includes apertures 295 adjacent the forward and rear ends thereof through which rack engaging dogs 300 project for the purpose of exerting a thrust against the dish racks supported within the compartment 22 and pushing such racks through the door 134 onto table 15. Referring to Fig. 13, each of the dogs 300 includes an upper cam surface 301 sloped upwardly and in a direction away from returning movement of the carriage. Each dog 300 also includes an extension 302 contained beneath cross member 287 and terminating in a bifurcated end 303 through which a stub shaft 305 extends to support the dog for projecting and retracting motion through the aperture 295. A torsion spring 306 is contained within the bifurcated end 303 of the dog and urges the cam end thereof to extend upwardly through aperture 295 and into rack engaging position, as shown in the drawings. Retracting movement of the carriage from its advanced position will result in the cam surfaces 301 striking the lower surfaces of a dishrack positioned in compartment 22 and will cause the dogs to retract into cross member 287, thus passing beneath the dish rack during retraction of the carriage without changing the position of the rack.

The two sections of the carriage are connected through a centrally located rod 310 threaded at its opposite ends into connecting blocks 311 and 312 and fixed with respect to these blocks by the block nuts 313 and 314, respectively. Block 311 is pivotally supported through a suitable shaft 315 within the carriage cross member 278, being carried upon an angle bracket 317 (Fig. 7a) which is fixed within the cross member 278. In a similar manner, block 312 is pivotally supported by a stub shaft 318 supported through an angle bracket 319 within cross member 287.

The lower edge of central door 170 is provided with a slot or recess 320 for receiving rod 310 in the closed position, with the carriage retracted. Also, the downwardly extending lip portion 176 is provided with a slot 321. This construction provides for concurrent movement of the two sections of the carriage normally within the compartments 20 and 22, and at the same time it provides for complete separation of the two compartments during operation of the various spraying mechanisms within these compartments. The overlapping arrangement of the central door and the depending lip portion 176 with respect to the central wall 160 provides for drainage of liquid splashed against the central door into the adjacent tank 30 or 105.

Referring to Figs. 7c, 8b, 8c and 9, the mechanism for actuating the carriage, to move it between its advanced and retracted positions, includes a drive shaft 325 journaled in supporting bearing stands 327 and 328 which are bolted or otherwise suitably connected to the table cross plate 256. A drive sprocket 330 is pinned to the inner end of shaft 325, beneath the center of table 15, and a crank 332 is secured by a collar 333 to the outer end of shaft 325 and includes a handle 334 for manual rotation of the shaft and drive sprocket. An idler sprocket 335 is journaled upon a hollow cross shaft 336 carried by a mounting bracket 338 which is in turn fixed to an adjustable mounting plate 340.

The plate 340 is provided with elongated slots 341 receiving bolts 342 for clamping plate 341 to a shelf member 343 fastened between legs 16. An adjusting screw 345 provided with a lock nut 346 is arranged to control the movement of the bracket 338, and thus to move sprocket 335 with respect to drive sprocket 330. Shaft 336 is closed at its outer end with a plug 348 for retaining lubricant therein, and this lubricant is supplied through a suitable tube 350 extending from shaft 336 outwardly of the back cross member 259 of the table and having a cap or grease cup 351 at its free outer end. A closed loop of drive chain 355 is received around the sprockets 330 and 335, and the upper flight of the drive chain is supported by a channel member 357 which is in turn supported at its opposite ends by brackets 358 and 359.

The connection between the carriage and drive chain 355 is provided by a bracket 360 (Fig. 9) having depending lugs 362 which replace one of the internal lengths of the chain and are attached to the remainder of the chain through the cross pins 363, thus forming in effect another link in the chain through which the sprocket 330 can mesh, as shown in Fig. 9. Therefore as crank 332 is rotated in a clockwise direction as viewed in Fig. 8b, the upper flight of chain 355 will move away from compartment 22, and the carriage will be pulled to its outer or advanced position, coming to rest when the cross member 288 engages the stops 365 (Figs. 7c and 8c) which are adjustably carried by bolts 367 having lock nuts 368 thereon for fixing the bolts to shelf member 343. Underneath the top of table 15, and beneath the advanced position of carriage angle members 285, are U-shaped drain members 370 which slope slightly from the outer end of table 15 toward the inner end of the table, adjacent the drain plate 270, and which extend through suitable openings in the lip 268 of the table top to drain liquid dripping from the advanced carriage back into the machine via drain plate 270.

In the operation of the carriage, advancing movement caused by rotation of the crank 332 causes the indexing angle 280 to engage the rack of dishes supported in compartment 20 and slide that rack along the supporting angle 242 and the entrance apron 245, through the open central door 170, and onto the supporting angles 242 in compartment 22. At the same time, if there is a rack of dishes in compartment 22, having just been rinsed, this rack will be engaged by the dogs 300 and pushed through door 134 out onto table 15. Such advancing movement of the carriage will approximately index the rack of dishes transferred from compartment 20 into compartment 22 in proper relation with respect to the revolving spray heads in compartment 22, since the leg of the indexing angle 280 in the advanced position of the carriage will be just slightly beyond the normal position of dogs 300, as shown in Figs. 7a, 7b, 8a and 8b. However, due to the wetted condition of the supporting angles 242 and of the dish racks, and due to the fact that advancing movement of the carriage can be quite rapid if the operator turns crank 332 with considerable force, it is possible for the inertia of the dish rack moving between compartments to carry it beyond its indexed position within compartment 22. To obviate this result, a retarding or braking mechanism is provided for the rinsing compartment.

Referring to Fig. 7b and to Fig. 14, this braking mechanism includes a supporting bracket 375 connected by bolt and nut fasteners 376 to the upright side of supporting angle member 242. A tubular hub 378 is carried in a vertical position upon one side of bracket 375. A braking shaft 380 extends through hub 378, and its lower end carries a torsion spring 382 having one end thereof hooked over a cross pin 383 extending transversely of shaft 380 and fixed therein by a set screw 384. The other or upper end of spring 382 includes an outwardly extending arm 385 which engages a stop sleeve 386 fixed in depending relation from the horizontal portion of bracket 375 by a bolt and nut fastener 387.

An upper rotating sleeve 390 is fitted over the upper end of shaft 380 and is fixed relative to the shaft by a cross pin 391 extending through shaft 380 and through slots 392 at opposite sides of sleeve 390, and similar slots 392' are provided at the lower end of sleeve 390. These latter slots have no function in the arrangement shown in Figs. 7b and 14, but are provided for receiving pin 391 when it is desired to mount the braking mechanism in compartment 20, when that compartment is used as a rinsing compartment. In such case the braking mechanism must of necessity be reversed, since the dish racks will be moving from right to left through the machine as viewed from the front.

A braking arm 395 is carried by sleeve 390, and a stop pin 396 extends vertically from the outer end of arm 395 and is urged by the force of torsion spring 382 into engagement with the vertical edge of supporting bracket 242. When a rack of dishes is pushed into compartment 22 by the carriage, the arm 395 engages the side of the dish rack and exerts a retarding or braking force against the dish rack as the moving rack tends to rotate arm 395 in a counterclockwise direction, as viewed from above in Fig. 7b, against the bias of spring 382. This retarding or braking action resists the tendency of the loaded dish rack to slide after the carriage has come to a stop, and thus provides for accurate indexing of the dish rack with respect to the spray arms in compartment 22. It will be apparent that by reversing the position of sleeve 390 on the shaft 380, so that arm 395 extends to the left rather than to the right of the shaft as viewed from the front of the machine, the braking mechanism just described may be mounted within compartment 20 when that compartment is arranged for use as a rinsing compartment.

Referring to Fig. 20, another type of indexing means is shown, for use in "straight through" installations of the type in Fig. 3 and Fig. 4, wherein the racks of soiled dishes are fed into the machine through a side door. With such an arrangement it is undesirable to use the indexing angle 280 (Fig. 7a), since such an angle member would obstruct to some extent the free entrance of the racks into the machine. In Fig. 20, like reference numerals have been applied to the parts which are the same as in the front loading type of installation shown in Fig. 7a.

A modified carriage cross member 398 is utilized in place of cross member 277, and spring actuated dogs 400 are mounted on stub shafts 401 extending through cross member 398. The dogs 400 are substantially the same as dogs 300 described above, and are biased into a normal position extending upwardly through openings 402 in cross member 398 by torsion springs 404. In the use of this modified indexing means, the trays of soiled dishes are pushed by the operator through door 130 or 134, as the case may be, into the washing compartment, and dogs 400 retract or cam below member 398 in the path of the advancing rack. Once the rack is thrust past the dogs, they return to their normal position, and the rack may be pulled back slightly against the upwardly extending edge 405 of dogs 400 to index it in proper relation with respect to the spray arms. Such a modified indexing means may be utilized adjacent either side door of the machine, depending upon whether the machine is installed for right to left or left to right operation.

The present dishwasher is provided with conventional filling pipes (not shown) for supplying a quantity of water to the tanks 30 and 105 prior to commencing operations of the machine. A certain amount of this water will be carried from the machine on the cleansed dishes, but the fresh hot water from the final rinsing mechanism provides the required makeup water in the rinsing compartment to keep the level within the tank of that compartment at the desired level. In order to supply makeup water to the washing compartment, a by-pass tube 407 is connected into header 46 and extends through the common central wall section 160 (Fig. 8a) into tank 105. A suitable valve 408 is included in tube 407 to control the flow of makeup water. The opening of this valve is preferably arranged so that the wash water in the washing compartment tank is replenished at a rate sufficient to change the wash water completely about four times per hour, requiring a flow of approximately three quarts of water through tube 407 per cycle of running of the pump 75, when the machine is in continuous use.

The washing compartment is also provided with a conventional automatic detergent dispenser (not shown) and with conventional detergent concentration control equipment (not shown). These devices maintain the desired concentration of detergent in the water sprayed through the power wash sprays, and automatically add detergent to the wash water as needed.

The invention provides control means for automatically operating the various liquid spraying means in the compartments 20 and 22 in accordance with a predetermined time cycle. In use, once the machine is set in operation, liquid is sprayed from the power wash spray arms for a certain period of time, and at the same time liquid is sprayed first from the power rinse arms and then from the pressure rinse arms. The control means also is interlocked with the doors of the machine to prevent operation of any of the spray arms while the doors are open, and to prevent disruption of the operation of the machine once it has been set into operation until the washing and rinsing cycles have been completed.

Referring to Figs. 18 and 19, a control arm 410 is pivoted at the upper right hand corner of the machine upon a stub shaft 412 about which the arm 410 can be manually pivoted. At its inner end adjacent the shaft 412 arm 410 includes an enlarged head 415 having slots 416 and 417 therein arranged for alignment above the adjacent upper corners of doors 134 and 136 when the control arm 410 is in its normal or "Off" position. In Fig. 19, where the head 415 is shown in both an "Off" and "On" position, in the "Off" position (shown in full lines) door 134 will pass through slot 417 and can be opened or closed as desired. In a similar manner door 136 can pass through slot 416 between open and closed positions.

When arm 410 is moved to the "On" position, the head is rotated sufficiently to bring portions of the remainder of the head over the upper corners of doors 134 and 136 for preventing opening of these doors, and conversely if the doors are open, the arm cannot be rotated since portions of the doors extend through the slots. Since only three doors are used at one time, namely one door on compartment 20, the central door 170, and one door on compartment 22, the doors will all be maintained in a closed position once they are closed and the control means is energized by arm 410, because movement of the arm will lock whichever of the doors 134 or 136 is in use in a closed position, and will prevent any operation of the counterweight mechanism.

Head 415 includes an outwardly extending boss portion 418 having on one side a flat cam surface 419. A control rod 420 is connected at one end to the boss 418 and at its other end to a switch operating head 422 having outwardly extending rod portions 423 which support head 422 for sliding movement between brackets 424. These brackets are in turn mounted upon the housing 425 which is fixed to the top 56 of compartment 22.

The housing 425 encloses a solenoid 430 having an operating arm 432 extending through the front thereof and attached to a bell crank 433 which is pivotally mounted on pin 434, and which includes a latch portion 435. The solenoid 430 operates against the bias of a spring 436 carried about operating arm 432 and urging bell crank 433 into the unlatched position, shown in solid lines in Fig. 18. When control arm 410 is moved to the "On" position, the control means provides for energization of solenoid 430, as will be described below, and causes bell crank 433 to pivot until the latch portion 435 moves to the dotted position, where it is aligned with the cam surface 419 on the control head to prevent movement of arm 410 to the "Off" position until the solenoid 420 is deenergized to withdraw the bell crank.

Fig. 21 is a schematic illustration of a wiring diagram for the control means provided for the dishwashing machine in accordance with the invention. The main control switch 440 is of the double pole single throw type and is controlled by the operating head 422, and the timer mechanism which controls the automatic operating cycle of the machine is indicated generally at 444. A suitable source of power, illustrated for purposes of example as a three wire supply 445, is connected to the motors 80 and 90 under the control of conventional three pole normally open magnetic switches 446 and 447, respectively. Power for the control means is provided through the leads 450 which extend from two wires of the supply to the blades of a double pole double throw manual switch 451 controlling the entire power supply to the control means.

The control circuits also include a four pole double throw manual switch 452 and a two pole double throw manual switch 453, and all three switches 451, 452 and 453 are located within control box 18 (Fig. 1) behind the three cover plates 454 which provide access to these switches for manual operation thereof. The purpose of these three switches is to provide for bypassing the automatic controls 444 in the event that there should be a mechanical failure therein, and thereby to permit the operator to use the machine entirely under manual control until the automatic controls can be repaired. Each of the switches 451, 452, and 453 accordingly has an automatic and a manual position.

In operation with switch 451 in its automatic position as shown, power is supplied to the controls 444 through wires 455 and 456 in which the control switch 440 is interposed, thereby placing the power supply to the entire machine under control of this switch 440. When switch 451 is in its manual position, power is supplied through the leads 457 and 458 to the contacts on the manual sides of switches 452 and 453. The blades of switch 452 are connected in circuit with the motor control switch 446 and 447, as shown in Fig. 21, so that in the automatic position of switch 452, power is supplied to the motor control switches from the automatic control means, as will be described below, while in the manual position of this switch, power is supplied directly from lines 457 and 458 to close switches 446 and 447 and run both motors 80 and 90.

The blades of switch 453 are connected to a solenoid 460 operating a normally closed valve 462 in the pressure rinse line 63, and thus when power is supplied to solenoid 460, valve 462 is opened to supply rinse water to the pressure rinse system in the rinsing compartment (Fig. 6). In the automatic position of valve 453, power is supplied to that switch through a lead 464 which is connected to power supply line 456, and through a lead 465 which extends from switch 453 to the timer. In its manual position, switch 453 connects solenoid 460 to the power supply lines 457 and 458 and thus (with switch 451 in its manual position) movement of switch 453 to its manual position will provide for opening of valve 462.

With the three switches 451, 452 and 453 in the automatic position, as illustrated, power is supplied to control switch 440, and upon closing of that switch by movement of arm 410, to the timer mechanism 444, which includes a conventional timer motor 470 operating cams (not shown) which control the movements of single pole double throw switches T1 and T2, as indicated schematically at 471. The timer mechanism 444 also includes a relay R operating relay switches R1 and R2 shown as of the single pole double throw type.

Fig. 22 is a diagram illustrating the relative operation of the cam controlled switches T1 and T2 during a typical cycle of operation, with the length of the overall cycle indicated by the arrow 475. Solid lines in the diagram illustrate the portion of the cycle during which switches T1 and T2 are in the solid line positions shown in Fig. 21, and similarly dotted lines illustrate the portions of the cycle during which these switches are in dotted positions. Thus, in a typical example of operation of the machine with an overall cycle of operation of thirty seconds, the first portion shown by arrow 476 will be of sixteen seconds duration, and during this portion of the cycle both the switches T1 and T2 will be in their full line positions.

Assuming that the machine has been loaded and the doors closed, and that the operator has moved arm 410 to close switch 440, power will be supplied through lines 455 and 456 to the timer mechanism 444 and to the contacts 477 and 478 on the automatic sides of switches 452 and 453, respectively. Power supply line 455 is connected through the blade of relay switch R2, and also to line 480 which is in turn connected with timer motor 470 and the blades of cam operated switches T1 and T2. Power supply line 456 is connected by a line 481 to a line 482 leading to the other side of timer motor 470 and to the coil of relay R. The other side of the relay coil is attached to a connecting line 484 extending to the back contact of switch T2 and also to the back contact of relay switch R1 through a line 485.

At the beginning of the operation of the machine, upon closing of switch 440, power is supplied to motors 80 and 90 as follows. Power for the wash motor 90 is provided by a connecting line 487 extending from power supply line 456 to one of the contacts 477 on switch 452. The other side of the circuit to the switch 447 is provided by a line 488 extending from contact 489, and the other end of line 488 is connected to the line 480 and also to the blade of switch T1. Since line 480 is connected to power supply line 455 through the wire 479, switch 447 is thus energized through lines 490, and motor 90 runs. This circuit is maintained throughout each cycle of the machine, so the interlock solenoid 430 and a pilot light 491 are wired across the wash motor supply 487 and 488, with resulting energization of the interlock solenoid and operation of the pilot light through each cycle of operation.

Power is supplied to the rinse motor control switch 446 through a line 492 connected to the other contact 477 and to power supply line 456, and through a second line 493 connected to the normally closed contact of switch T1. Line 493 leads to the contact 495 of switch 451, and thus power is supplied by lines 496 to magnetic switch 446 when switch T1 is in its full line position as illustrated. Therefore, for the first portion of the cycle indicated by arrow 476, rinse motor 80 also runs. At the end of the first sixteen seconds of the cycle, switch T1 moves to its dotted position for a period of about three seconds, indicated by arrow 500 in Fig. 22. This cuts off the power supply to motor 80 and shuts down the power rinse pump 75. This three-second period is provided as a dwell during which liquid runs out of the power rinse heads 50 and 58 (Fig. 6), with motor 90 continuing to operate and to supply liquid to the power wash spray heads 120 and 121.

At the end of the dwell period, for a final time interval of about eleven seconds indicated by arrow 501 both of switches T1 and T2 are in their dotted line positions. Motor 80 remains at rest due to breaking of its power supply circuit at switch T1. Switch T2 in its dotted position closes a circuit from the line 480 to line 484 and through the coil of relay R and line 481 to power supply line 456. Energization of relay R moves switches R1 and R2 to their dotted positions, with the result that power is supplied to switch 453, and thence to solenoid 460, through line 465, relay switch R2, and line 480 which is now connected to power supply line 455 through a connection 505 to the back contact of switch T1.

When solenoid 460 is energized, rinse valve 462 opens and provides a supply of clear hot water to the pressure rinse system in the rinsing compartment. Furthermore, relay R is locked in its dotted line position through a holding circuit including line 455, switch R1, connection 485, the relay coil, the line 482 and the connecting line 481 to supply line 456. Thus any further movement of the switches T1 and T2 has no effect upon relay R until that relay is deenergized by opening switch 440 to cut off the main power supply to the control means.

During this entire sequence of operation, motor 90 remains energized and continues to run. Just before the end of the cycle, switch T2 is returned to its full line position, and thus the supply of power to timer motor 470 comes only through the back or dotted contact of switch T1. At the end of the cycle, switch T1 returns to its full line position, shutting off the timer motor and also cutting off the power supply to wash motor 90 by isolating the first terminal connection 480 from the main power supply. In addition, interlock solenoid 430 and pilot light 491 are deenergized, and the operator is thereby informed that the machine has reached the end of the cycle. Since bell crank 433 has been withdrawn by deenergization of the interlock solenoid, arm 410 can be moved to its "Off" position to unlock the doors and permit opening thereof for unloading, transfer, and loading of the dish racks. At the same time, switch 440 is opened to cut off the power supply to the timer and deenergize relay R, thereby resetting the control means for the next operation.

The operation of the machine may thus be briefly summarized as follows. Assuming that there is a rack of soiled dishes in compartment 20, and that a rack of dishes has been washed but not rinsed in compartment 22, the operator closes the doors by pulling down on one of the doors on one of the compartments, such as the loading door of the washing compartment. He then moves arm 410 to the "On" position and the cycle of operation is begun. Motors 80 and 90 operate to supply washing and power rinsing liquid to the various power spray heads in compartments 20 and 22. At the end of a certain interval, the motor for the pump in the rinsing compartment is deenergized while the motor for the washing pump remains in operation. After a short dwell to provide for drainage from the power rinse arms, a pressure liquid is supplied to the pressure rinse arm and spray nozzles, while at the same time the motor for the washing compartment is kept in operation.

At the end of the pressure rinsing interval, the valve controlling the supply of pressure rinse liquid is closed, the motor for the wash compartment is turned off, and the interlock solenoid is deenergized to unlatch control arm 410 which has been locked in the "On" position. The operator moves the control arm to the "Off" position, opens the doors, and rotates crank 332 to advance the carriage and push the rack of washed and rinsed dishes from compartment 22 onto table 15. Advancing movement of the carriage transfers the rack of washed dishes from the washing compartment to the rinsing compartment, and the rinsed dishes to the clean dish table. The crank is then rotated in reverse direction to return the carriage to its original position, and the operator pushes another rack of soiled dishes into the washing compartment, closes the doors, and repeats the entire operation.

It will thus be seen that the present invention provides a high capacity dishwashing machine which is semi-automatic in operation, and which occupies a minimum of space. A typical machine according to the invention is capable of discharging a completely washed rack of dishes every thirty seconds, and with an experienced operator it is capable of an overall production rate of about one rack of dishes per thirty-five to forty seconds.

While the forms of apparatus herein described constitute preferred embodiments of the present invention, it is to be understood that the invention is not limited to these precise forms of apparatus, and that changes may be made therein without departing from the scope of the invention which is defined in the appended claims.

What is claimed is:

1. In a dishwashing machine of the character described, a closed housing divided into two compartments of substantially equal dimensions, each said compartment having a tank at its bottom and spray heads in the upper portion thereof for spraying fluid over the dishes to be cleansed, a pump for each said compartment connected to supply fluid from the associated said tank to the associated said spray heads, a supply source of rinsing fluid, rinsing spray heads for mounting in one of said compartments adapted for connection to said supply source, means for mounting said rinsing spray heads in either of said compartments to provide for use of that compartment in which said rinsing spray heads are mounted as a rinsing compartment, control means for operating the pump in that one compartment in which said rinsing spray heads are mounted for a timed interval and for subsequently connecting said rinsing spray heads to the source of rinsing fluid for a second timed interval, additional control means providing for operation of the pump in the other said compartment during the combined said time intervals, means for establishing an operating cycle of both said control means, and interlock means maintaining operation of both said control means during said cycle.

2. A dishwashing machine of the character described comprising means defining a wash compartment including a front door and a side door each openable to provide access to the washing compartment, means in said washing compartment for spraying washing fluid over dishes supported therein, means defining a rinsing compartment including a front door and a side door each openable to provide access to the rinsing compartment, means in said rinsing compartment for spraying rinsing fluid over dishes supported therein, said washing and rinsing compartments having a center door therebetween for preventing escape of fluid from either of said compartments into the other compartment, said door being openable to provide for passage of dishes from one to the other of said compartments, means for opening and closing said center door and said side door in said rinsing compartment and one of said doors in said washing compartment substantially in unison, and means for transferring dishes from said washing compartment to said rinsing compartment and for simultaneously discharging dishes through said side door of said rinsing compartment, said transferring means including a central section arranged for overlapping engagement with said center door in the closed position thereof.

3. A dishwashing machine of the character described comprising means defining a washing compartment, means defining a rinsing compartment alongside said washing compartment, means in said compartments for spraying fluid over dishes supported therein to wash and rinse the dishes, a central door between said compartments for separating said compartments during operation of said spraying means and for providing an opening between said compartments through which racks of dishes are passed after operation of said spraying means, means for transferring racks of dishes from said washing compartment to said rinsing compartment, and means in said rinsing compartment cooperating with said transferring means to locate the racks of dishes in said rinsing compartment in predetermined precise relation with respect to said fluid spraying means therein.

4. In a dishwashing machine of the character described the combination of a closed housing divided into two compartments of substantially equal dimensions providing a washing compartment and a rinsing compartment, means in said compartments for spraying fluid over dishes supported therein to cleanse the dishes, a central door between said compartments separating said compartments during operation of said spraying means and for providing an opening for movement of the dishes between said compartments, said rinsing compartment having a discharge opening in the side thereof opposite from said central door, a carriage extending between said washing compartment and said rinsing compartment for transferring a rack of dishes from said washing to said rinsing compartment and simultaneously discharging a rack of dishes from said rinsing compartment, said carriage having a central section arranged for overlapping engagement with said central door in the closed position thereof to prevent escape of fluid from said washing and rinsing compartments during operation of said spraying means, means supporting said carriage for movement between said compartments through said central door and outwardly through said discharge opening to transfer dishes from said washing compartment to said rinsing compartment and simultaneously to discharge dishes from said rinsing compartment through said discharge opening, and means in said rinsing compartment cooperating with said carriage means to locate the racks of dishes transferred into said rinsing compartment in predetermined precise relation with respect to the fluid spraying means therein.

5. A dishwashing machine of the character described comprising means defining a washing compartment, means defining a rinsing compartment alongside said washing compartment, means in each said compartment for performing cleansing operations on dishes supported within racks therein, a central door between said compartments for separating said compartments during operation of said cleansing means and for providing an opening for movement of the dish racks between said compartments upon completion of the cleansing operations, said rinsing compartment having a discharge opening in the side thereof opposite from said common wall, a carriage extending between said washing and rinsing compartments and including a central section adapted to cooperate with said central door in the closed position thereof to separate said washing and rinsing compartments, means supporting said carriage for reciprocating movement through said central door and said discharge opening, means on the end of said carriage movable within said washing compartment for locating a dish rack in precise relation in said washing compartment with respect to the cleansing means therein, means in said rinsing compartment cooperating with said carriage to locate a dish rack in precise location with respect to the cleansing means therein upon reciprocation of said carriage to move such rack from said washing compartment to said rinsing compartment, and means on said carriage for ejecting a dish rack from said rinsing compartment through said discharge opening.

6. In a dishwashing machine adapted for operation by passing racks of dishes therethrough in either of two opposite directions and also adapted for alternate loading from either the front or the side, a housing providing two compartments of substantially equal dimensions, a tank at the bottom of each said compartment, spray heads in each said compartment for spraying fluid over dishes supported in the associated compartment, a central door extending between and adapted to separate said compartments, means at the front and side of each said compartment for supporting front and side doors providing access to said compartments, an entrance door supported for controlled movement between open and closed positions on that one of said compartments operating as a washing compartment, an exit door supported for controlled movement between open and closed positions on the side of the other said compartment, means for opening and closing said central door and said entrance and exit doors substantially in unison providing for loading and unloading of racks of dishes from the machine and for transfer of racks between said compartments, and transfer means operable through the openings provided by said central door and said exit door when they are in said open position including means for indexing the racks in predetermined alignment with the spray heads in each said compartment.

7. In a dishwashing machine adapted for operation by passing racks of dishes therethrough in either of two opposite directions and also adapted for alternate loading from either the front or the side, a housing providing two compartments of substantially equal dimensions, a tank at the bottom of each said compartment, spray heads in each said compartment for spraying fluid over dishes supported in the associated said compartment, pumps connected between said tanks and said spray heads for recirculating fluid from each said tank through the associated said spray heads, a central door extending between said compartments and mounted for opening and closing movement to separate said compartments during operation of said spray heads, means for supporting doors at the front and side of each said compartment, an entrance door supported for controlled movement between open and closed positions on that compartment operating as a washing compartment, an exit door supported for controlled movement between open and closed positions on the side of that compartment operating as a rinsing compartment, reciprocable carriage means operable between a rest position within said machine and a transfer-discharge position extending through said exit door to unload said rinsing compartment and simultaneously to transfer a rack from said washing to said rinsing compartment, means for opening and closing said central door and said entrance and exit doors substantially in unison providing for loading of racks of dishes into said washing compartment and for operation of said carriage means for discharge of racks and for transfer of racks between said compartments, and final rinse spray means adapted for mounting in either of said compartments and located in that compartment operating as a rinsing compartment for spraying a final rinse fluid over the dishes prior to discharge of said racks through said exit door.

References Cited in the file of this patent
UNITED STATES PATENTS

| Number | Name | Date |
|---|---|---|
| 1,490,310 | Blakeslee | Apr. 15, 1924 |
| 1,495,473 | Fitzgerald | May 27, 1924 |
| 1,512,918 | Forsgard | Oct. 28, 1924 |
| 1,662,496 | Forsgard | Mar. 13, 1928 |
| 1,697,894 | Wright | Jan. 8, 1929 |
| 2,073,521 | Johnston et al. | Mar. 9, 1937 |
| 2,229,663 | Meeker et al. | Jan. 28, 1941 |
| 2,618,282 | Stanitz et al. | Nov. 18, 1952 |